United States Patent
Jaarda et al.

(10) Patent No.: US 7,188,876 B2
(45) Date of Patent: Mar. 13, 2007

(54) BUMPER ASSEMBLY INCLUDING ENERGY ABSORBER WITH VERTICAL TRANSLATION CRUSH LOBES

(75) Inventors: Eric J. Jaarda, Milan, MI (US); Alok Nanda, Bangalore (IN); Stephen F. Shuler, Royal Oak, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/940,828

(22) Filed: Sep. 14, 2004

(65) Prior Publication Data

US 2006/0055187 A1    Mar. 16, 2006

(51) Int. Cl.
*B60R 19/18* (2006.01)
(52) U.S. Cl. .................. 293/133; 293/121; 296/187.03
(58) Field of Classification Search ........ 293/120–122, 293/133, 187.03, 187.09, 187.11
See application file for complete search history.

(56) References Cited

U.S. PATENT DOCUMENTS

| | | | | |
|---|---|---|---|---|
| 4,762,352 A | * | 8/1988 | Enomoto | .................... 293/120 |
| 5,984,389 A | | 11/1999 | Nuber et al. | |
| 6,082,792 A | * | 7/2000 | Evans et al. | ................. 293/133 |
| 6,406,081 B1 | * | 6/2002 | Mahfet et al. | .............. 293/133 |
| 6,609,740 B2 | * | 8/2003 | Evans | ......................... 293/121 |
| 6,663,150 B1 | * | 12/2003 | Evans | ......................... 293/120 |
| 6,726,262 B2 | * | 4/2004 | Marijnissen et al. | ......... 293/121 |
| 6,746,061 B1 | * | 6/2004 | Evans | ......................... 293/120 |
| 6,848,730 B2 | * | 2/2005 | Evans | ......................... 293/121 |
| 6,863,322 B2 | * | 3/2005 | Hunter et al. | ................ 293/120 |
| 2001/0026073 A1 | | 10/2001 | Sata et al. | |
| 2003/0111852 A1 | * | 6/2003 | Carley et al. | ................ 293/109 |
| 2004/0066048 A1 | | 4/2004 | Mooijman et al. | |
| 2004/0169381 A1 | | 9/2004 | Evans et al. | |
| 2004/0174025 A1 | | 9/2004 | Converse et al. | |

* cited by examiner

*Primary Examiner*—D. Glenn Dayoan
*Assistant Examiner*—Greg Blankenship
(74) *Attorney, Agent, or Firm*—Armstrong Teasdale LLP

(57) ABSTRACT

A bumper system for an automobile vehicle includes, in an exemplary embodiment, a beam and an energy absorber coupled to the beam. The beam has a top surface and a bottom surface, and is configured to attach to the vehicle. The energy absorber includes a body having a first side and an opposing second side, a plurality of crush lobes extending from the first side, and a plurality of vertical translational crush lobes extending from the second side. The second side faces the beam, and each vertical translational crush lobe engages the top surface or the bottom surface of the beam.

21 Claims, 3 Drawing Sheets

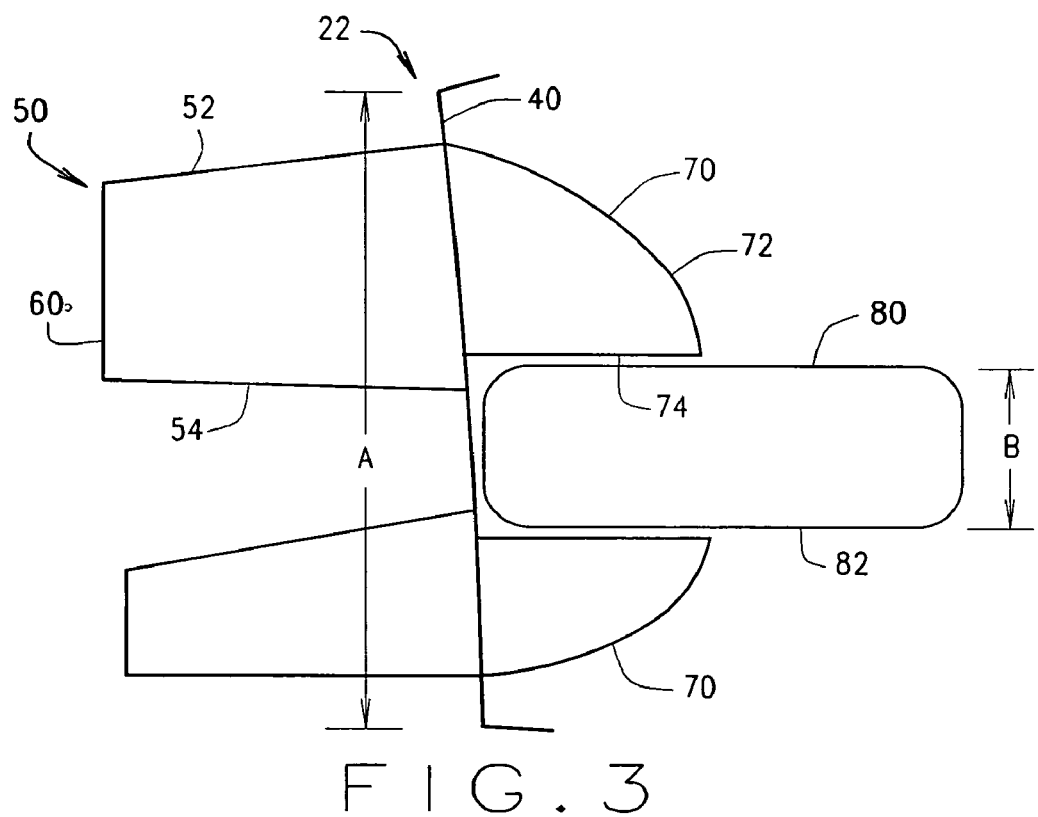
F I G. 3
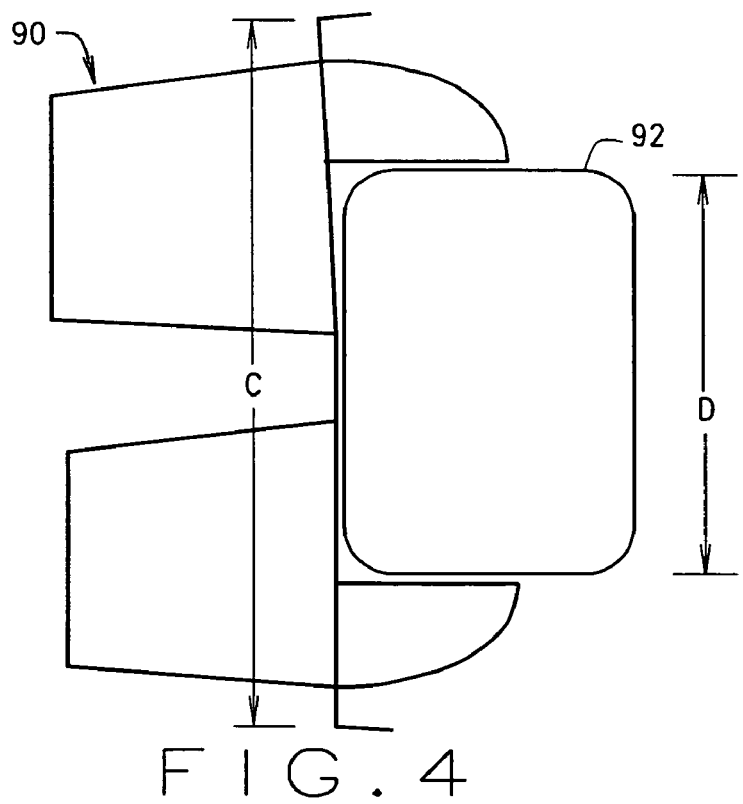
F I G. 4

BUMPER ASSEMBLY INCLUDING ENERGY ABSORBER WITH VERTICAL TRANSLATION CRUSH LOBES

BACKGROUND OF THE INVENTION

This invention relates generally to automobile vehicle bumpers, and more particularly, to energy absorbing vehicle bumper systems.

A known standard which bumper systems often are designed to meet is the United States Federal Motor Vehicle Safety Standard (FMVSS). For example, some energy absorbing bumper systems attempt to reduce vehicle damage as a result of a low speed impact by managing impact energy and intrusion while not exceeding a rail load limit of the vehicle. In addition, some bumper systems attempt to reduce pedestrian injury as a result of an impact.

A bumper system typically includes a beam that extends widthwise across the front or rear of a vehicle and is mounted to rails that extend in a lengthwise direction. The beam typically is steel, and the steel beam is very stiff and provides structural strength and rigidity. To improve the energy absorbing efficiency of a bumper system, some bumper systems also include shock absorbers.

The efficiency of an energy absorbing bumper system, or assembly, is defined as the amount of energy absorbed over distance, or the amount of energy absorbed over load. A high efficiency bumper system absorbs more energy over a shorter distance than a low energy absorber. High efficiency is achieved by building load quickly to just under the rail load limit and maintaining that load constant until the impact energy has been dissipated.

To improve the energy absorbing efficiency, shock absorbers sometimes are positioned, for example, between the steel bumper beam and the vehicle rails. The shock absorbers are intended to absorb at least some of the energy resulting from an impact. Adding shock absorbers to a bumper assembly results in an added cost and complexity as compared to a steel beam. The shocks also add weight to the bumper assembly, which is also undesirable since such added weight may reduce the overall fuel efficiency of the vehicle.

Other known energy absorbing bumper systems include a foam energy absorber. Foam based energy absorbers typically have slow loading upon impact, which results in a high displacement. Further, foams are effective to a sixty or seventy percent compression, and beyond that point, foams become incompressible so that the impact energy is not fully absorbed. The remaining impact energy is absorbed through deformation of the beam and/or vehicle structure.

BRIEF DESCRIPTION OF THE INVENTION

In one aspect, a bumper system for an automobile vehicle is provided. The bumper system includes a beam and an energy absorber coupled to the beam. The beam has a top surface and a bottom surface, and is configured to attach to the vehicle. The energy absorber includes a body having a first side and an opposing second side, a plurality of crush lobes extending from the first side, and a plurality of vertical translational crush lobes extending from the second side. The second side faces the beam, and each vertical translational crush lobe engages the top surface or the bottom surface of the beam.

In another aspect, a bumper assembly for an automobile vehicle is provided. The bumper assembly includes a beam having a top surface and a bottom surface, an energy absorber coupled to the beam; and a fascia attached to the energy absorber to substantially envelop the beam and the energy absorber. The beam is configured to attach to the vehicle, and the energy absorber includes a body having a first side and an opposing second side with the second side facing the bean, a plurality of crush lobes extending from the first side, and a plurality of vertical translational crush lobes extending from the second side. Each vertical translational crush lobe engages the top surface or the bottom surface of the beam.

In another aspect, an energy absorber for a vehicle bumper system including a bumper beam having a top surface and a bottom surface is provided. The energy absorber includes a body having a first side and an opposing second side, a plurality of crush lobes extending from the first side, and a plurality of vertical translational crush lobes extending from the second side. Each vertical translational crush lobe is configured to engage the top surface or the bottom surface of the beam.

BRIEF DESCRIPTION OF THE DRAWINGS

FIG. 3 is a cross-sectional illustration of the bumper assembly shown in FIG. 1.

FIG. 4 is a cross-sectional illustration of a bumper assembly in accordance with another embodiment of the present invention.

DETAILED DESCRIPTION OF THE INVENTION

A bumper system that includes an energy absorber that is designed to provide high and low offset impact protection is described below in detail. In an exemplary embodiment, an energy absorber of the non-foam type is attached to a beam. The beams are fabricated, for example, from steel, aluminum, or glass mat thermoplastic (GMT). The energy absorber, in the exemplary embodiment, is fabricated from Xenoy® material and is tunable so as to meet desired impact criteria, e.g., pedestrian and low speed impacts. More particularly, the energy absorber redirects the horizontal impact during low speed FMVSS, CMVSS, and ECE42 impact to the upper and lower surfaces of the bumper beam. The bumper system provides over/under-ride impact performance by using the molded energy absorber to translate lateral forces to the upper and/or lower beam surface. Impact forces during the specified types of impacts are maintained just below a predetermined level by deforming the energy absorber and beam until the kinetic energy of the impact event has been absorbed. When the impact is over, the energy absorbers return substantially to their original shape and retain sufficient integrity to withstand subsequent impacts.

Although the bumper system is described below with reference to specific materials (e.g. Xenoy® material (commercially available from General Electric Company, Pittsfield, Mass.) for the energy absorber), the system is not limited to practice with such materials and other materials can be used. For example, the beam need not necessarily be a steel, aluminum, or GMT compression molded beam, and other materials and fabrication techniques can be utilized. Generally, the energy absorber is fabricated from materials that result in efficient energy absorption, and the beam materials and fabrication technique are selected to result in a stiff beam.

The bumper system is designed to promote better high and low impact performance. Improved management of vehicle over/under ride conditions permit bumper beams with smaller sizes and masses to be incorporated in the bumper system. The bumper system provides for effective use of an energy absorber extending above and/or below the forward face of the beam. The energy absorber includes crush lobes extending behind the energy absorber's cursory reaction plane above and/or below the bumper beam. The rear-directed crush lobes react with the upper and/or lower surfaces of the bumper beam to provide a forward, horizontal force to absorb the impact energy. This configuration permits the design of taller bumpers having beams of lesser height and thus lower mass.

Figure 1:
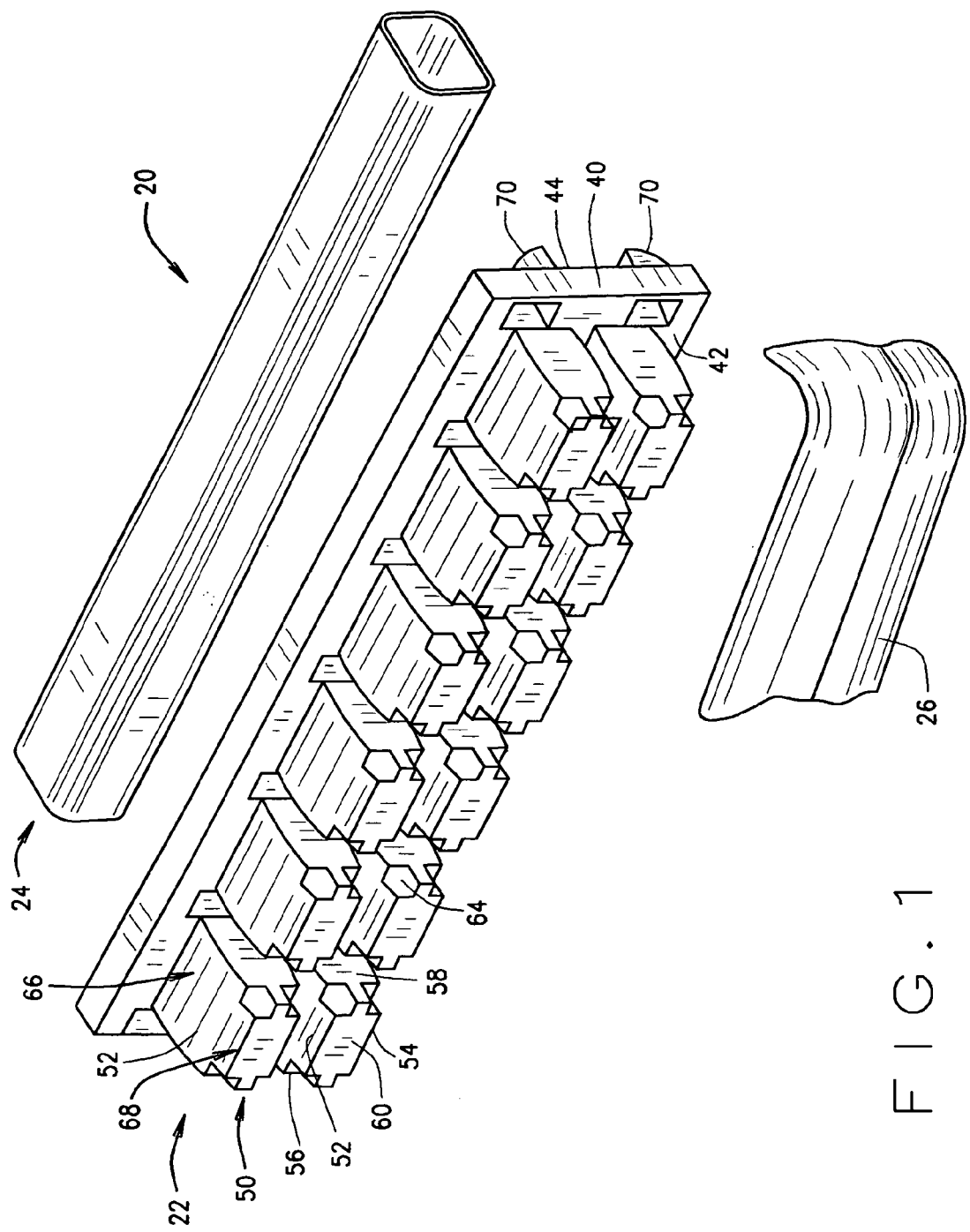
FIG. 1 is an exploded perspective illustration of a bumper assembly in accordance with an embodiment of the present invention.
Figure 2:
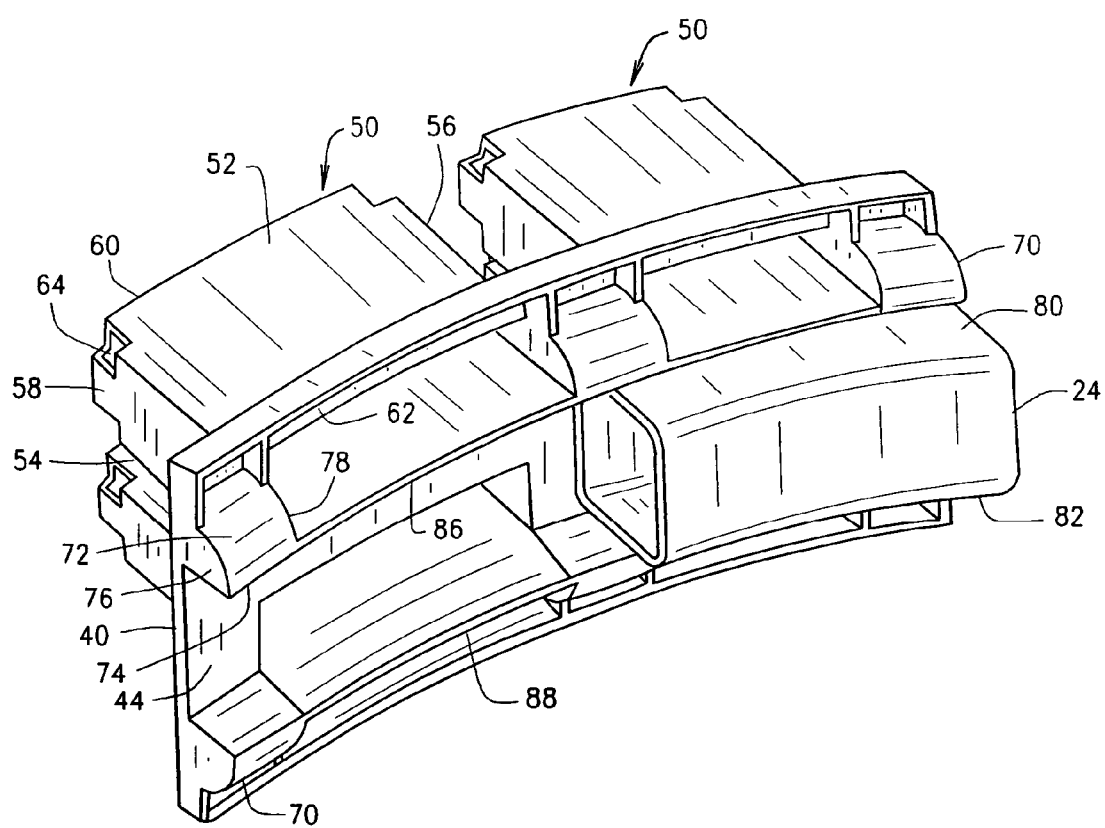
FIG. 2 is a rear perspective illustration of the bumper assembly shown in FIG. 1.

Referring to the drawings, FIG. 1 is an exploded perspective illustration of a bumper assembly 20 in accordance with an exemplary embodiment of the present invention. FIG. 2 is a rear perspective illustration of bumper assembly 20, and FIG. 3 is a cross-sectional illustration of bumper assembly 20. Referring to FIGS. 1–3, bumper assembly 20 includes an energy absorber 22 and a beam 24. Energy absorber 22 is positioned between beam 24 and a fascia 26 which, when assembled, form vehicle bumper assembly 20. As should be understood by those skilled in the art, beam 24 is attached to lengthwise extending vehicle frame rails (not shown).

Fascia 26 typically is generally formed from a thermoplastic material amenable to finishing utilizing conventional vehicle painting and/or coating techniques. Generally, fascia 26 envelops both energy absorber 22 and reinforcing beam 24 such that neither component is visible once attached to the vehicle.

Beam 24, in the exemplary embodiment, is fabricated from extruded aluminum. In other embodiments, beam 24 is fabricated from roll formed steel or a compression molded glass mat thermoplastic (GMT). Beam 24 can have one of multiple geometries, including being configured as a rectangular section, a B-section, a D-section, an I-beam, or having a C or W cross-sectional shape. The geometry of beam 24 is selected to provide a desired section modulus depending on the particular application in which the beam is to be used.

Energy absorber 22 includes a body 40 having a first side 42 and a second side 44. First side 42 faces away from beam 24 and second side 44 faces toward beam 24. A plurality of crush lobes 50 extend from first side 42 of energy absorber body 40. Lobes 50 are spaced apart from each other, and each lobe 50 includes a first traverse wall 52, a second traverse wall 54, a first side wall 56, a second side wall 58, and an outer wall 60. Traverse walls 52 and 54, side walls 56 and 58, and outer wall 60 define a hollow cavity 62 in crush lobe 50. Each crush lobe 50 also includes at least one opening 64 in at least one of traverse walls 52 and 54, side walls 56 and 58, and outer wall 60. Each lobe 50 can be tuned to have a predetermined stiffness. Lobes 50 are tuned by varying the size, shape, and position of openings 64 in traverse walls 52 and 54, side walls 56 and 58, and outer wall 60.

In the exemplary embodiment, traverse walls 52 and 54, side walls 56 and 58 vary linearly in thickness from a front-most portion 66 to a rearmost portion 68. In one embodiment, the wall thickness varies from about 1 millimeter (mm) to about 7 mm, in another embodiment, from about 1.5 mm to about 5 mm, and still another embodiment, from about 2.5 mm to about 3.5 mm. In further embodiments, the thickness of the walls is constant from front-most portion 66 to rearmost portion 68 and is between about 1 mm to about 7 mm. In still further embodiments, the thickness of the walls is stepped. Particularly, the thickness of the walls of front-most portion 66 is constant and the thickness of the walls of rearmost portion 68 is constant with the walls of rearmost portion 68 thicker than the walls of front-most portion 66.

A plurality of vertical translational crush lobes 70 extend from second side 44 of energy absorber body 40. Each vertical translational crush lobe 70 includes a first transverse wall 72, a second transverse wall 74, a first side wall 76, and a second side wall 78. Transverse walls 72 and 74, and side walls 76 and 78 define a hollow cavity in vertical translational crush lobe 70. Each vertical translational crush lobe 70 extends from energy absorber body second side 44 and engages either a top surface 80 or a bottom surface 82 of beam 24. Particularly, second traverse wall 74 of vertical translational crush lobe 70 engages top surface 80 or bottom surface 82 of beam 24 to translate lateral forces from an impact event to top surface 80 or bottom surface 82 of beam 24. Vertical translational crush lobes 70 redirects the horizontal impact forces during low speed FMVSS, CMVSS, and ECE42 impact to top surface 80 or bottom surface 82 of beam 24. In the exemplary embodiment first transverse wall 72 is curved and intersects second traverse wall 74. In alternate embodiments other configurations of first and second transverse walls can be used.

Energy absorber 22 also includes a first flange 86 and a second flange 88 extending from second side 44 of energy absorber body 40. First and second flanges 86 and 88 overlap beam 24 and attach energy absorber 22 to beam 24. In the exemplary embodiment, second traverse wall 74 of each vertical translational crush lobe 70 is integral with first flange 86 or second flange 88.

The characteristics of the material utilized to form energy absorber 22 include high toughness/ductility, thermally stable, high energy absorption capacity, a good modulus-to-elongation ratio and recyclability. While the energy absorber may be molded in segments, the absorber also can be of unitary construction made from a tough plastic material. An example material for the absorber is Xenoy material, as referenced above. Of course, other engineered thermoplastic resins can be used. Typical engineering thermoplastic resins include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene (1/hdpe), polypropylene (pp) and thermoplastic olefins (tpo).

As shown in FIG. 3, a height A of energy absorber 22 is greater than a height B of beam 24. FIG. 4 illustrates another embodiment where a height C of an energy absorber 90 is greater than a height D of a beam 92. Also, height B of beam 24 shown in FIG. 3 is less than the height D of beam 92. Vertical translational crush lobes 70 in energy absorber 22 permit bumper assembly designs with low profile beams as illustrated in FIGS. 3 and 4 while providing high and low offset impact protection.

While the invention has been described in terms of various specific embodiments, those skilled in the art will recognize that the invention can be practiced with modification within the spirit and scope of the claims.

What is claimed is:

1. A bumper system for an automobile vehicle, said bumper system comprising:
    a beam having a top surface and a bottom surface, said beam configured to attach to the vehicle; and
    an energy absorber coupled to said beam, said energy absorber comprising:
    a body having a first side and an opposing second side, said second side facing said beam;
    a plurality of crush lobes extending from said first side; and
    a plurality of vertical translational crush lobes extending from said second side, each said vertical translational crush lobe engaging said top surface or said bottom surface of said beam, each said vertical translational crush lobe comprising a plurality of sides, said plurality of sides defining a hollow vertical translational crush lobe;
    said energy absorber further comprising a vertical dimension that is greater than a vertical dimension of said beam.

2. A bumper system in accordance with claim 1 wherein each said vertical translational crush lobe extends from said body of said energy absorber to said top surface or said bottom surface of said beam to translate lateral forces to said top surface or said bottom surface of said beam during an impact event.

3. A bumper system in accordance with claim 1 wherein each said crash lobe comprises a first traverse wall, a second traverse wall, a first side wall, a second side wall, and an outer wall, said first traverse wall, said second traverse wall, said first side wall, said second side wall, and said outer wall defining a hollow crash lobe.

4. A bumper system in accordance with claim 3 wherein at least one of said traverse said first traverse wall, said second traverse wall, said first side wall, said second side wall, and said outer wall comprise at least one opening.

5. A bumper system in accordance with claim 1 wherein said energy absorber comprises a thermoplastic material.

6. A bumper system in accordance with claim 5 wherein said energy absorber comprises an injection molded thermoplastic material.

7. A bumper system in accordance with claim 1 wherein said beam comprises at least one of steel, aluminum, thermoplastic, and glass mat thermoplastic.

8. A bumper assembly for an automobile vehicle, said bumper assembly comprising:
    a beam having a top surface and a bottom surface, said beam configured to attach to the vehicle;
    an energy absorber coupled to said beam; and
    a fascia attached to said energy absorber to substantially envelop said beam and said energy absorber;
    said energy absorber comprising:
    a body having a first side and an opposing second side, said second side facing said beam;
    a plurality of crush lobes extending from said first side; and
    a plurality of vertical translational crush lobes extending from said second side, each said vertical translational crush lobe engaging said top surface or said bottom surface of said beam, each said vertical translational crush lobe comprising a plurality of sides, said plurality of sides defining a hollow vertical translational crush lobe;
    said energy absorber further comprising a vertical dimension that is greater than a vertical dimension of said beam.

9. A bumper assembly in accordance with claim 8 wherein each said vertical translational crush lobe extends from said body of said energy absorber to said top surface or said bottom surface of said beam to translate lateral forces to said top surface or said bottom surface of said beam during an impact event.

10. A bumper assembly in accordance with claim 8 wherein each said crash lobe comprises a first traverse wall, a second traverse wall, a first side wall, a second side wall, and an outer wall, said first traverse wall, said second traverse wall, said first side wall, said second side wall, and said outer wall defining a hollow crash lobe.

11. A bumper assembly in accordance with claim 10 wherein at least one of said traverse said first traverse wall, said second traverse wall, said first side wall, said second side wall, and said outer wall comprise at least one opening.

12. A bumper assembly in accordance with claim 8 wherein said energy absorber comprises a thermoplastic material.

13. A bumper assembly in accordance with claim 12 wherein said energy absorber comprises an injection molded thermoplastic material.

14. A bumper assembly in accordance with claim 8 wherein said beam comprises at least one of steel, aluminum, thermoplastic, and glass mat thermoplastic.

15. An energy absorber for a vehicle bumper system including a bumper beam having a top surface and a bottom surface, said energy absorber comprising:
    a body having a first side and an opposing second side;
    a plurality of crush lobes extending from said first side; and
    a plurality of vertical translational crush lobes extending from said second side, each said vertical translational crush lobe configured to engage the top surface or the bottom surface of the beam, each said vertical translational crush lobe comprising a plurality of sides, said plurality of sides defining a hollow vertical translational crush lobe.

16. An energy absorber in accordance with claim 15 wherein each said vertical translational crush lobe extends from said second side body of said energy absorber and is configured to engage the top surface or the bottom surface of the beam to translate lateral forces to the top surface or the bottom surface of the beam during an impact event.

17. An energy absorber in accordance with claim 15 wherein each said crash lobe comprises a first traverse wall, a second traverse wall, a first side wall, a second side wall, and an outer wall, said first traverse wall, said second traverse wall, said first side wall, said second side wall, and said outer wall defining a hollow crash lobe.

18. An energy absorber in accordance with claim 17 wherein at least one of said traverse said first traverse wall, said second traverse wall, said first side wall, said second side wall, and said outer wall comprise at least one opening.

19. An energy absorber in accordance with claim 15 wherein said energy absorber comprises a thermoplastic material.

20. An energy absorber in accordance with claim 19 wherein said energy absorber comprises an injection molded thermoplastic material.

21. An energy absorber in accordance with claim 15 wherein said beam comprises at least one of steel, aluminum, thermoplastic, and glass mat thermoplastic.

* * * * *